United States Patent [19]

Zukausky

[11] Patent Number: 4,541,562
[45] Date of Patent: Sep. 17, 1985

[54] MIXING VALVE

[75] Inventor: Keith E. Zukausky, Glen Ellyn, Ill.

[73] Assignee: Eaton Corporation, Cleveland, Ohio

[21] Appl. No.: 529,365

[22] Filed: Sep. 6, 1983

Related U.S. Application Data

[63] Continuation-in-part of Ser. No. 279,763, Jul. 2, 1981, Pat. No. 4,444,215.

[51] Int. Cl.[4] ............................................. G05D 23/19
[52] U.S. Cl. ............................... 236/12.12; 236/12.21; 137/490; 137/606; 361/161; 361/203
[58] Field of Search ...................... 236/12.12, 12.21; 137/606, 490, 491, 489; 361/161, 162, 163, 165, 186, 203

[56] References Cited

U.S. PATENT DOCUMENTS

| | | | |
|---|---|---|---|
| 824,681 | 6/1906 | Ashley | 137/490 |
| 1,361,737 | 12/1920 | McVoy | 137/490 |
| 2,287,810 | 6/1942 | Lund | 137/607 |
| 2,296,266 | 9/1942 | Breckenridge | 236/12.21 |
| 2,925,824 | 2/1960 | Rockwell | 137/490 |
| 3,322,342 | 5/1967 | Veale | 236/12.12 |
| 3,351,085 | 11/1967 | Allingham | 137/489 |
| 3,721,386 | 3/1973 | Brick et al. | 236/12.12 |
| 3,809,109 | 5/1974 | Breiling et al. | 137/88 |
| 4,084,603 | 4/1978 | Howard | 137/606 |
| 4,270,570 | 6/1981 | Kolze | 137/606 |
| 4,420,811 | 12/1983 | Tarnay et al. | 236/12.12 |

Primary Examiner—Martin P. Schwadron
Assistant Examiner—James R. Shay
Attorney, Agent, or Firm—Fay, Sharpe, Fagan, Minnich & McKee

[57] ABSTRACT

The mixing valve includes a plurality of flow regulating assemblies (A) each of which independently regulates the flow of one of a plurality of fluids. Each flow regulating assembly includes a pressure displaceable structure (22) which is physically displaced by changes in pressure and a movable valving member (50) which is movable relative to a stationary valve seat (42) for adjusting the cross section of a flow path therebetween. The movable valving member is operatively connected with the pressure displaceable structure such that the cross section of the flow path varies generally in inverse proportion to the sensed pressure. A proportioning assembly (B) proportions back pressure from adjacent a mixed fluid outlet (132) between the flow regulating assemblies such that each flow regulating assembly regulates its fluid flow in accordance with the proportion of the back pressure accorded it. A mixed fluid selecting valve assembly (C) selectively connects the proportioning valve assembly with one of a plurality of mixed fluid outlets which have larger and smaller diameter sections to cause relatively low and high back pressures, hence, relatively high or low flow rates. A mixed fluid temperature control (D) monitors the temperature of the mixed fluid adjacent the mixed fluid outlet and controls the proportioning assembly to maintain the mixed fluid substantially at a selected temperature.

19 Claims, 3 Drawing Figures

MIXING VALVE

BACKGROUND OF THE INVENTION

This application is a continuation-in-part of application Ser. No. 279,763, filed July 2, 1981, now U.S. Pat. No. 4,444,215.

This application pertains to the art of mixing or blending valves and assemblies and fluid pressure regulators. The invention is particularly applicable to mixing valves for appliances which selectively mix hot and cold water and will be described with particular reference thereto. It will be appreciated, however, that the invention has other applications where pressure regulation and selectively controlled fluid mixing are desired, such as industrial formulating operations in which the flows of a plurality of liquid constituents are continuously mixed in preselected proportions, water temperature regulators in which hot and cold water are selectively mixed to maintain a constant water temperature, or the like.

Commonly, appliance mixing valves have directly controlled the flow of incoming hot and cold water in fixed proportion with a hot water control valve and a cold water control valve. Note for example, U.S. Pat. No. 4,270,570, issued June 2, 1981 to L. A. Kolze and assigned to the assignee herein. Further, appliance mixing valves usually supplied hot, cold, or warm water at either a high or a low flow rate. To select the high or low flow rate, a flow rate control solenoid valve selectively connected the hot and cold solenoid valves with an unrestricted or high flow rate outlet and a restricted or low flow rate outlet.

One problem with the prior art mixing valves is that the flow rate from the mixing valve varied for hot, cold and warm water. The warm water being connected with two supply lines flowed at a faster rate than either the hot or the cold. Another problem was that variations in the hot and cold water line pressures not only varied the flow rates of hot and cold water but varied the temperature of warm water. Yet another problem was that variations in the temperature of the hot or cold water caused corresponding variations in the temperature of the warm water.

One solution was to use flow control washers in the hot and cold water inlets which generally equalized hot and cold water flow rates even with fluctuating line pressure and stabilized the temperature of the warm water. However, the flow rate of warm water through the mixing valve was still greater than the flow rate of hot or cold water. One problem with flow control washers was that they required precision manufacturing techniques and precise engineering tolerances. The durometer hardness of the rubber and the diameter of the flow opening had to be carefully controlled. This required relatively expensive manufacturing techniques. Even with the expensive precision manufacturing techniques, the flow control flow rates tended to vary with temperature, particularly hot and cold water. The flow control properties of the washers varied, not only with temperature, but with age. With age the rubber hardened, particularly the rubber in the hot water flow path, changing the regulated flow rate.

SUMMARY OF THE INVENTION

The present invention contemplates a new and improved mixing valve and pressure regulator which overcomes the above-referenced problems and others. It provides a valve assembly which is relatively inexpensive, yet accurately controls fluid flow rates and temperatures and relative fluid flow rates over a wide range of pressures and temperatures.

In accordance with the present invention, there is provided a fluid mixing apparatus for mixing a cooler fluid with a warmer fluid to produce a mixed fluid flow having a selectable intermediate temperature. The mixing apparatus includes means for defining a cooler fluid inlet which is adapted to be connected with a source of the cooler fluid under pressure to receive cooler fluid therefrom. A first regulating assembly is connected with the cooler fluid inlet means for regulating the pressure of the cooler fluid. A warmer fluid inlet means defines a warmer fluid inlet which is adapted to be connected with a source of warmer fluid under pressure to receive the warmer fluid flow therefrom. A second regulating assembly is operatively connected with the warmer fluid inlet means for regulating the pressure of the warmer fluid. An outlet means defines at least one mixed fluid outlet for discharging the mixed fluid flow. The mixed fluid flow developes a back pressure adjacent the outlet means. A fluid pressure proportioning means is disposed between the outlet means and the first and second regulating assemblies for selectively proportioning the back pressure between the first and second regulating assemblies. The back pressure is proportioned such that the pressure proportioning means causes the first and second regulating assemblies to control the relative flow rates of the cooler and warmer fluid flows. A mixed fluid temperature control means controls the fluid pressure proportioning means such that the mixed fluid substantially maintains the selectable intermediate temperature.

In accordance with a more limited aspect of the invention, the mixed fluid temperature control means includes temperature sensing means for sensing the temperature of the mixed fluid and temperature selection means. An error means monitors the error between the selected and sensed fluid temperatures. A proportioning valve control means produces a control signal for controlling the fluid pressure proportioning means. The proportioning valve control means is connected with the error means to adjust the control signal in accordance with the error between the sensed and selected temperatures.

A primary advantage of the present invention is that it accurately controls the relative amounts of continuously mixed fluid components even with variations in the relative pressure of the components.

Another advantage of the present invention is that it accurately controls a mixed fluid flow rate without expensive flow control washers.

Yet another advantage of the present invention is that it accurately controls the temperature of a flow of mixed hot and cold water even as the temperatures and pressures of the hot and cold water vary.

Still further advantages will become apparent upon reading and understanding the following detailed description of the preferred embodiment.

DESCRIPTION OF THE DRAWINGS

The present invention may take form in various parts and arrangements of parts. The FIGURES herein are only for purposes of illustrating a preferred embodiment of the present invention and are not to be construed as limiting the invention.

DETAILED DESCRIPTION OF THE PREFERRED EMBODIMENT

Figure 1:
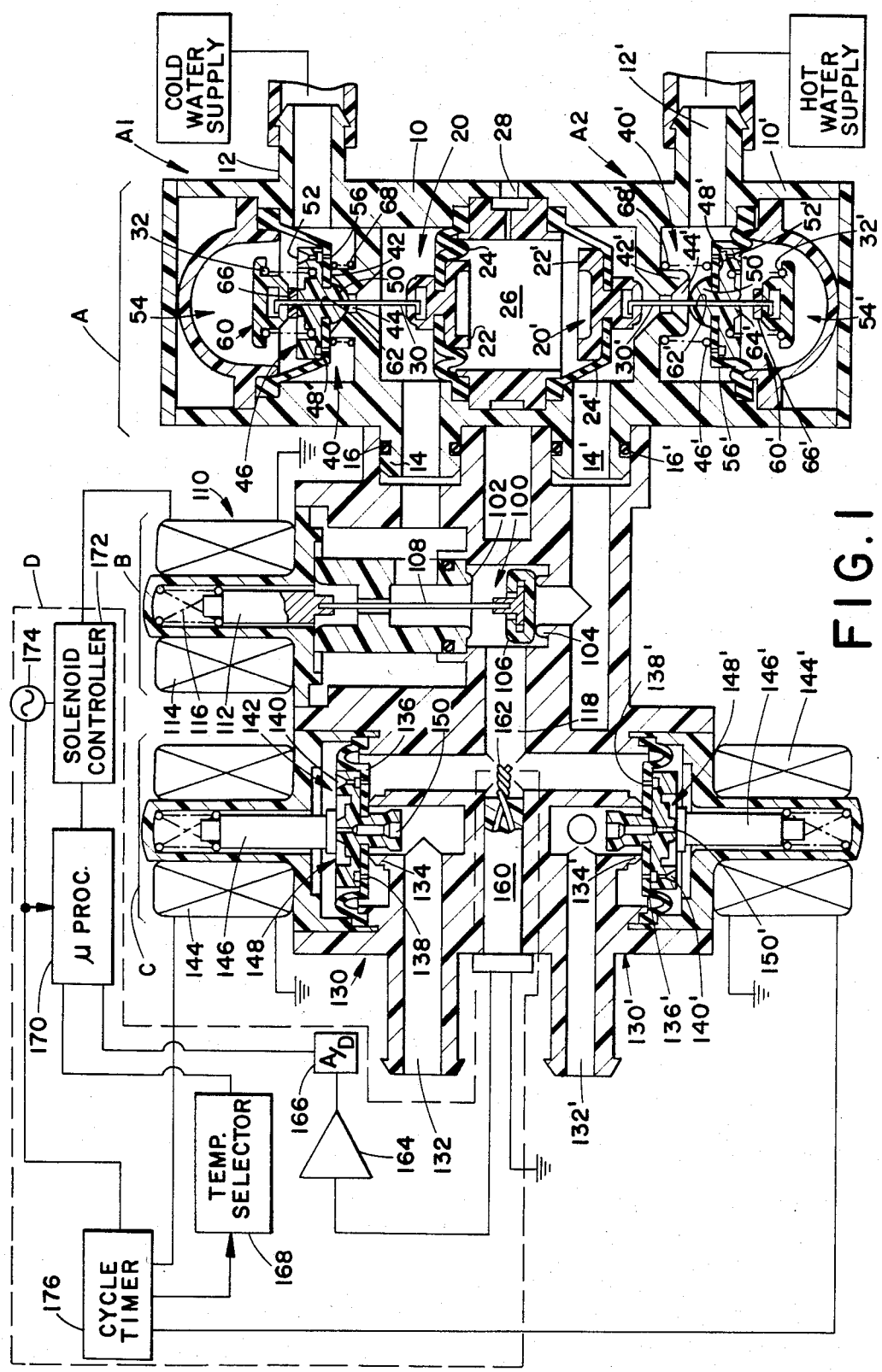
FIG. 1 is a side sectional view of a mixing valve assembly in accordance with the present invention.

With reference to FIG. 1, a mixing valve in accordance with the present invention includes a plurality of regulating assemblies A for independently regulating the pressure or flow rates of a plurality of fluids. In the preferred embodiment, the regulating assembly includes a first or cold water flow regulating assembly A1 for regulating the flow of cold or cooler water to a preselected substantially constant flow rate by regulating its pressure to a preselected regulated pressure and a second or hot water flow regulating assembly A2 for regulating the flow of hot or warmer water to the preselected substantially constant flow rate by regulating its pressure to the preselected regulated pressure. Optionally, the regulating assemblies A may include additional regulating assemblies for regulating the flow of additional fluids as is appropriate to the environment in which the mixing valve is used. A fluid pressure proportioning means B proportions the back pressure, i.e. fluid pressure within the mixing valve, between the cooler and warmer water or additional regulating assemblies. In this manner the magnitude of the back pressure determines the total flow rate of all fluids mixed together and the proportioning means causes the first and second regulating assemblies to control the relative flow of cooler and warmer water and other fluids. A mixed fluid flow rate selecting means C selects the flow rate of the mixed fluids. More specifically, the mixed fluid flow selecting means selectively adjusts the back pressure in the mixing valve to select the total mixed fluid flow rate and to cause the plurality of regulating assemblies each to adjust its flow in accordance with the portion of the back pressure selected by the proportioning means B. A mixed fluid temperature control means D monitors the temperature of the mixed fluid and controls the proportioning means to maintain the mixed fluid substantially at a selected temperature.

In the embodiment of FIG. 1, the flow regulating assembly A includes two regulating assemblies—the first or cold water regulating assembly A1, and the second or hot water regulating assembly A2. For simplicity of illustration and because each of the regulating assemblies is the same, the first or cold water regulating assembly A1 is described in detail and it is to be appreciated the description applies equally to the second or hot water regulating assembly A2 and, where appropriate, additional regulating assemblies. Corresponding parts of the hot and cold water flow regulating assemblies are identified with the same reference with the parts of the hot water regulating assembly being followed by a prime (').

The first regulating assembly includes a valve housing 10 having a fluid inlet 12 and a fluid outlet 14 with an O-ring seal 16. Disposed adjacent the outlet 14 is a pressure sensing means 20 for sensing the fluid pressure adjacent the outlet. The pressure sensing means includes a pressure responsive structure 22 which is physically displaced by changes in pressure. A diaphragm 24 is disposed between the displaceable structure 22 and an atmospheric pressure cavity 26 which is vented to the atmosphere by a vent passage 28. The displaceable structure 22 is connected by a connecting rod 30 with a biasing spring 32. This allows the displaceable structure 22 to move until the pressure across the sensing diaphragm reaches a preselected regulated pressure. The regulated pressure is equal to the spring force of spring 32 and sensing diaphragm 24 divided by the area of the sensing diaphragm 24. Because, as is explained below, the spring 32 remains in substantially the same state of compression over a wide range of inlet pressures, the regulated pressure is substantially constant, hence the flow rate through the fixed cross section outlet 14 is substantially constant. Other structures which are physically displaced by changes in fluid pressure, such as bellows, spring biased pistons, or the like, are also contemplated.

Also disposed between the inlet 12 and outlet 14 is an adjustable valve means 40 which provides a flow path of adjustable cross section to fluid moving from the inlet 12 to the outlet 14. The adjustable valving means 40 selectively varies the flow path cross section to regulate the fluid flow to maintain the sensed pressure at the preselected regulated pressure. The adjustable valving means 40 is connected with the pressure sensing means 20 such that increases in the sensed pressure decrease the flow path cross section, and decreases in the sensed pressure increase the flow path cross section. The adjustable valving means 40 includes a stationary valve seat 42 with a fluid passage 44 extending therethrough and a movable valving member 46 which moves relative to the stationary valve seat 42 to adjust the cross section of the flow path therebetween. The movable valving member 46 includes a valving diaphragm 48 which seats against the valve seat 42 in a sealing relationship when no flow of the fluid is to be permitted. The valving diaphragm 48 has a first face disposed adjacent the inlet 12 for being biased by inlet fluid pressure away from the valve seat 42. The movable valving member also includes a domed or conical flow regulating projection 50 which with the stationary valve seat 42 defines the variable cross section flow path. The movable valving member 46 has a pilot supply aperture 52 in fluid communication between the inlet 12 and a pilot reservoir 54 defined by a pilot reservoir defining means or portion of the housing 10. Any difference in the pilot reservoir pressure and the inlet pressure causes the valving diaphragm 48 to shift in a manner which tends to equalize the pressure differential. A plurality of filtering apertures 56 which are smaller than the pilot aperture 52 filter the fluid flowing from the inlet to the pilot reservoir.

The connecting rod 30 also connects the pressure sensing means 20 with a pilot valve structure 60 for modulating the fluid flow from the pilot reservoir to maintain a generally constant pressure differential across the valving diaphragm 48. The movable valving member 46 or other suitable means defines a pilot outlet aperture 62 which is larger than the pilot supply aperture 52 and a surrounding pilot valve seat 64. A pilot valving member 66 modulates the flow rate through the pilot outlet aperture 62. The pilot valving member 66 is biased away from the pilot valve seat 64 by the spring or biasing means 32 and is connected with the connecting rod 30 to be moved toward or away from the pilot valve seat in response to increases or decreases in the sensed pressure. The equilibrium inlet pilot reservoir pressure differential maintained by the pilot valve structure 60 is equal to the spring force of spring 32 and valving diaphragm 48 divided by the area of the valving diaphragm 48.

The pilot valve structure 60 is dimensioned such that relatively little travel between pilot valve seat 64 and pilot valving member 66 balances the flow rate through pilot outlet aperture 62 with the flow rate through the pilot supply aperture 54. Because this travel is short, the spring force of the spring 32 remains substantially constant over the full stroke of the adjustable valving means 40 and the actual spring constant is relatively unimportant. Optionally, a counter biasing spring 68 may be used to reduce the required size of the valving diaphragm 48 and still provide sufficient flow at very low inlet pressures. For applications with extreme differences in the first and second fluid pressures, the vent 28 may be reduced or eliminated. With the vent 28 eliminated, positioning the adjustable valving means near the valve seat on the high pressure side causes the pressure sensing diaphragm to compress the air in pressure cavity 26. This increases the reference pressure, hence the regulated pressure and the flow rate of the low pressure fluid.

In operation, when a flow control valve downstream of outlet 14 is shut off, the flow regulating valve assembly assumes a position shown by the first regulating assembly A1. When the downstream control valve is opened, the pressure on pressure sensing diaphragm 24 is reduced and the displaceable structure 22 rises. As the connecting rod 30 rises, the pilot valve 60 is opened allowing fluid to flow from the pilot reservoir 54 into outlet 14. As fluid flows from pilot reservoir 54, a pressure differential between the pilot reservoir 50 and inlet 12 is caused which lifts the valving diaphgram 48. This opens the flow path 44 through the adjustable valving means 40. The flow through the path 42 increases the pressure on the sensor diaphragm 24 moving it downward. Downward movement of the displaceable structure 22 restricts the pilot valve 60 to reestablish the equilibrium inlet pilot reservoir pressure differential. This change in the inlet pilot reservoir pressure differential moves valving member 46 toward the valve seat 42. Quickly, an equilibrium position between the flow regulating projection 50 and the valve seat 42 and between the pilot valving member 66 and pilot valve seat 64 is reached in which the regulated pressure is achieved at the outlet 14. If the inlet pressure decreases, the pressure on sensing diaphragm 24 similarly decreases allowing the diaphragm to lift. As the connecting rod 30 is lifted with the displaceable structure 22, the pilot valve is opened further and the fluid pressure in the pilot reservoir is reduced. This change in the inlet-pilot reservoir pressure differential causes the adjustable valving member 46 to move away from the valve seat 42 increasing the flow through path 44 and moves the pilot valve seat 64 toward the pilot valving member 66 restricting the pilot outlet flow until the equilibrium condition is again reached. When the flow control valve downstream from the outlet 14 is shut off, the pressure sensed by the pressure sensor diaphragm 24 exceeds the regulated pressure moving it downward closing the pilot valve outlet. Through the pilot supply aperture 54 the pressure between the inlet 12 and the pilot reservoir 54 reaches equilibrium stabilizing the adjustable valving member 46 in its closed position. The spring force of the spring 32 and the valving diaphragm 48 and the difference between the inlet and regulated pressures combine with the relatively large area of the valve seat 42 to close the adjustable valving means 40. Even if the valving means 40 fails to close the downstream flow control valve is closed so there is no leakage.

With continued reference to FIG. 1, the proportioning means B includes a proportioning fluid valve 100 having a pair of oppositely disposed proportioning valve seats 102 and 104 and a proportioning valve member 106. The first proportioning valve seat 100 is connected with the outlet 14 of the first or cold water flow regulator assembly A1 and the second valve seat 104 is connected with outlet 14' of the second or hot water flow regulator assembly A2. The proportioning valve member 106 is configured for selectively assuming (i) a sealing relationship with valve seat 102, (ii) a sealing relationship with valve seat 104, and (iii) a continuum of positions between the two valve seats. The proportioning valve member 106 is connected by a proportioning valve connecting rod 108 with a proportioning valve solenoid control means 110. The proportioning valve control means 110 includes an armature 112 which is connected with the connecting rod 108 and a solenoid coil 114 which is adapted to draw the armature against a spring 116, drawing the proportioning valve member 106 toward the first valve seat 102. The distance which the armature 112 and proportioning valve member 106 are drawn against the spring and toward the first valve seat 102 is proportional to the electric power flowing through the solenoid coil. This enables the proportioning valve member 106 to be positioned at a continuum of selectable positions between the valve seats. Further, under oscillating electric power, e.g. an AC voltage, the positioning valve member oscillates or dithers about a selected median position. The dithering damps or slows the feedback of sudden changes in the back pressure to the flow regulator assemblies. The damping eliminates over reaction to sudden back pressure changes which, in turn, prevents the flow regulator assemblies from entering an oscillating mode.

To select cold water only, the solenoid coil 114 receives no actuating potential. The spring 110 biases the proportioning valve member 106 against hot water valve seat 104 and allows cold water to pass through the first flow regulating assembly A1 and valve seat 102 to a proportioning means outlet 118. The direct fluid connection between proportioning means outlet 118 and the sensing diaphragm 24 causes the fluid pressure at the proportioning means outlet 118 to be sensed by the diaphragm 24. When only hot water is to be supplied, the solenoid 114 receives a full actuating power causing the proportioning valve member 106 to seat against the cold water valve seat 102. Hot water flows from the hot water inlet 12' through the second flow regulating assembly A2 and the hot water valve seat 104 to the proportioning means outlet 118. The pressure at the proportioning means outlet 118 is sensed by the diaphragm 24' such that the hot water flows with the same preselected flow rate as did the cold water.

When warm water is to be selected, a partial, A.C. actuating potential is received by the solenoid coil 114. The A.C. actuating potential is selected to be of such a magnitude that proportioning valve member 106 is raised toward valve seat 102 but oscillates or dithers about a selected intermediate position. As the proportioning valve member 106 oscillates, the pressure at the proportioning means outlet 118 is proportioned correspondingly between the diaphragms 24 and 24'. This divides the pressure between the hot water and cold water flow regulating assemblies such that the flow rate of warm water through the proportioning means outlet 118 is substantially the same as the flow rate of hot water alone or cold water alone. By positioning the proportioning valve member 106 more near the cold water valve seat 102, the mixed fluid flow receives a higher percentage of hot water. By positioning the proportioning valve member more near the hot water valve seat 104 a higher percentage of cold water flows in the mixed fluid flow through the proportioning means outlet 118. Alternately, the surface of proportioning valve member 106 adjacent to the proportioning valve seats 102 and 104 may be domed for defining more precise and more limited flow paths therebetween.

The mixed fluid flow rate selecting means C includes electrically operated valving means for selecting one of a plurality of flow rates or back pressures. The mixed fluid flow rate selecting means C includes a high flow rate selecting valve 130 and a low flow rate selecting valve 130' which are disposed between the blending valve outlet 118 and a high flow rate mixed fluid outlet 132 and a low flow rate mixed fluid outlet 132', respectively. For simplicity of illustration, the high flow rate valve is described in detail and it is to be appreciated that the description applies by analogy to the low flow rate valve in which like parts are marked with the same reference numeral followed by a prime ('). The valve assembly 130 includes a stationary valve seat 134 and a movable outlet valve member 136. Outlet pilot supply passages 138 and 140 allow the fluid pressure at proportioning means outlet 118 and a reservoir 142 to come into equilibrium. To open the valve 130, a solenoid coil 144 receives an appropriate biasing potential to lift an armature 146. The armature 146 is connected with a pilot valve assembly 148 which allows the fluid in reservoir 142 to flow to the mixed fluid outlet 132 through a pilot outlet passage 150. This unbalances the pressure equilibrium between proportioning means outlet 118 and reservoir 142 allowing the pressure from the proportioning means outlet 118 to lift the outlet valve member 136. This provides fluid communication with the high flow rate, mixed fluid outlet 132. The flow rate is determined by the diameter of the mixed fluid outlet 132.

The low flow rate outlet 132' is smaller in diameter than the high flow rate outlet 132. This smaller diameter outlet increases back pressure, hence the fluid pressure at proportioning means outlet 118 which, in turn, reduces the flow rates of the hot and cold water flow regulating assemblies. In this manner, the low flow rate is caused. In the preferred embodiment, the low flow rate valve assembly has two outlet nipples. The exact number of outlet nipples, of course, is determined by the appliance with which the valve is used and may be a single outlet or a plurality of outlets.

Alternately, the mixed fluid flow rate selecting means C may include a rotatable valve shaft which at each of a plurality of preselected angular positions connects the proportioning means outlet 118 with a mixed fluid outlet through a different sized flow restrictor. Each flow restrictor is sized with a different diameter passage to create different back pressures, hence, different mixed fluid outlet rates.

The mixed fluid temperature control means D includes a temperature sensing means 160 for sensing the temperature of the mixed fluid and providing a sensed temperature signal. A characteristic of the sensed temperature signal varies in accordance with the sensed temperature. In the embodiment illustrated in FIG. 1, the sensed temperature signal is a digital signal. More specifically, the temperature sensing means 160 includes a thermocouple 162, an amplifier 164 for amplifying the thermocouple junction voltage, and an analog to digital convertor 166 for converting the analog sensed temperature signal to a digital sensed temperature signal. A temperature selection means 168 provides a selected temperature signal, a characteristic of which varies with the selected temperature for the mixed fluid. By way of example, the temperature selection means may be a circuit chip which responds to operator actuated temperature selection push buttons by producing an appropriate, corresponding digital selected temperature signal. A temperature error means 170, such as a microprocessor, compares the selected temperature signal and the sensed temperature signal to determine the difference or error therebetween. The microprocessor controls a proportioning valve solenoid control means 172 for providing a proportioning valve control signal. The control signal provides an appropriate amount of power to the proportioning valve solenoid to bring and maintain the selected and sensed temperature into conformity. For example, the solenoid control means may control the amount of electrical power in a unipolar pulse train which operates the proportioning valve solenoid. In one embodiment, the proportioning solenoid control means 172 includes a pulse width modulator for varying the width of pulses from an oscillator 174. This produces a unipolar oscillating solenoid control signal which includes a train of pulses having a fixed amplitude and frequency but whose width varies with the error signal. The percentage of the pulse train which is non-zero, i.e. its duty cycle, determines the median position of the proportioning member 106.

Optionally, the solenoid control signal may be an unfiltered, fully or partially rectified signal. An AC signal may be half or full wave rectified and the power transmitted by the pulse train varied with the error signal. The power may be controlled by varying the pulse amplitude, width, number, or the like. As yet another option, the solenoid control signal may be produced by superimposing a DC component to control median solenoid position and an AC component to control dithering.

In the embodiment of FIG. 1, the microprocessor is programmed to compare the selected and sensed temperature signals at regular intervals, e.g. five millisecond intervals. Whenever the selected temperature exceeds the sensed temperature, the microprocessor increments its output signal a selected digital increment; each time the selected temperature is less than the sensed temperature, the microprocessor decrements its output by the fixed digital increment. A cycle timer 176 selectively actuates the solenoid coils 114, 144, and 144' as is appropriate to the water requirements of the washer as it goes through its washing cycle. Optionally, the cycle timer may further control the temperature selected by the temperature selection means at selected times during the washing cycle. Optionally, the microprocessor 170 may vary its output in accordance with the magnitude of the difference between the sensed and selected temperatures. That is, rather than increasing the counter in fixed increments, the amount of increase may be in proportion to the difference between the sensed and selected temperatures.

Figure 2:
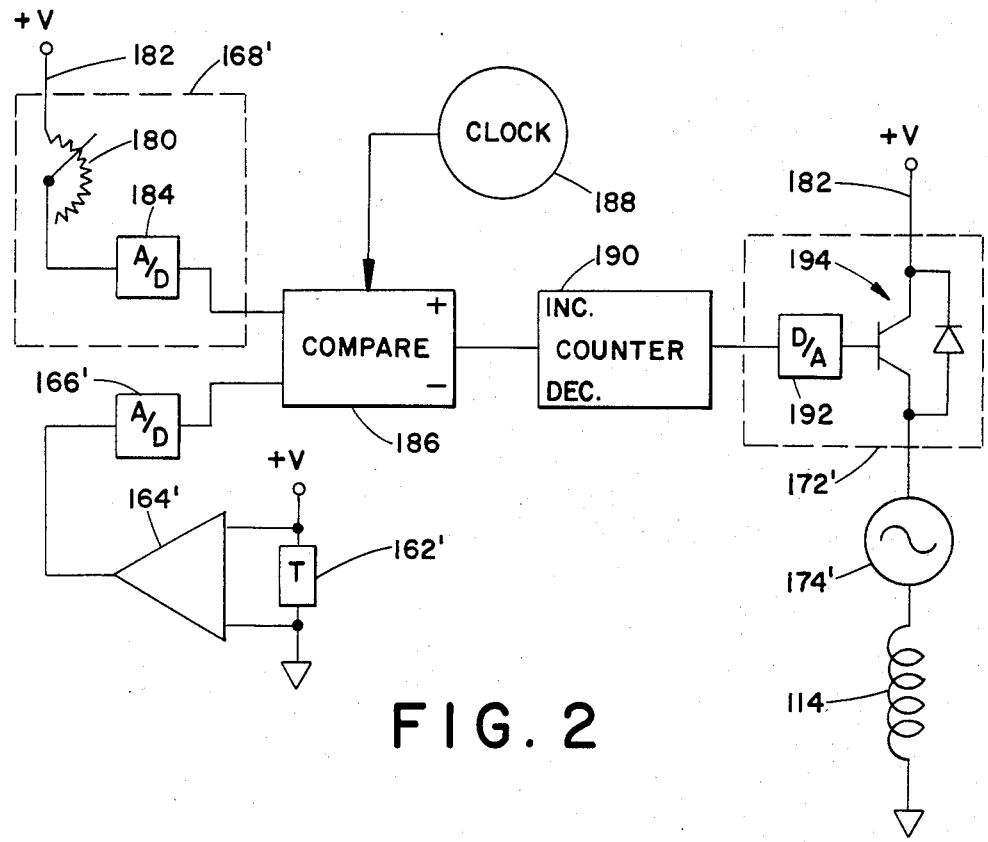
FIG. 2 illustrates an alternate embodiment of temperature control circuitry in accordance with the present invention.

With reference to FIG. 2, an alternate embodiment of the mixed fluid temperature control means D is illustrated. In the embodiment of FIG. 2, like elements with the embodiment of FIG. 1 are denoted with the same reference numerals but followed by a prime ('). A thermister 162' monitors the temperature of the mixed fluid. An amplifier 164' produces an analog signal varying in accordance with the sensed temperature which is converted to a digital signal by an analog to digital converter 166'. A temperature selection means 160' includes a variable resistor 180 which varies the proportion of a DC voltage from a DC voltage supply 182 which is received by an analog to digital convertor 184. The analog to digital convertor 184 produces a digital selected temperature signal. An error means 170' includes a comparing means 186 which compares the digital sensed and selected temperature signals. A clock means 188 periodically actuates the comparing means 186. Each time the comparing means determines that the selected temperature exceeds the sensed temperature, it increments a counter 190. Each time the comparing means senses that the sensed temperature is less than the sensed temperature, the comparing means decrements the counter 190. A proportioning solenoid control means 172' converts the count from the counter 190 into an appropriate DC voltage control signal. The proportioning solenoid control means includes a digital to analog convertor 192 which converts the digital count into an appropriate analog control signal. A transistor 194 provides a DC component which varies in proportion to the count from the counter 190 and an AC source 174' supplies an AC component to cause dithering.

Figure 3:
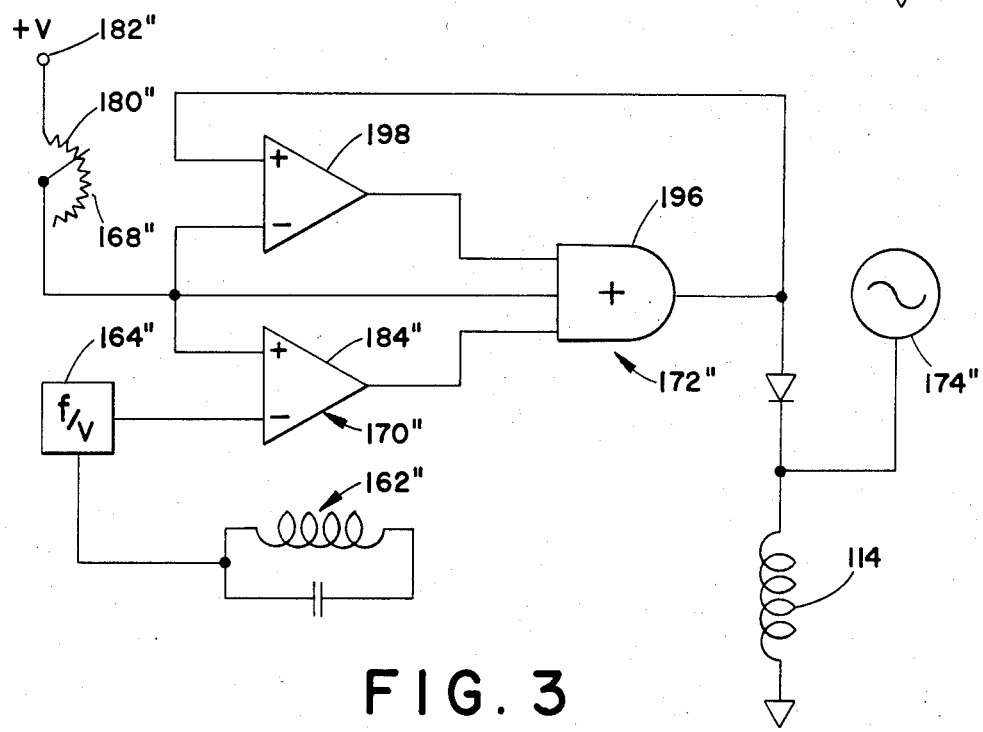
FIG. 3 illustrates another alternate embodiment of temperature control circuitry in accordance with the present invention.

With reference to FIG. 3, an analog mixed fluid temperature control means is illustrated. In the embodiment of FIG. 3, like elements with the embodiments of FIGS. 1 and 2 are denoted by the same reference numeral but followed by a double prime ("). A temperature sensitive LC oscillator 162" is disposed in the mixed fluid flow. A frequency to voltage convertor 164" converts the frequency of the LC oscillator to a voltage signal which varies in proportion to the sensed temperature. A temperature selection means 168" includes a variable resistor 180" which selectively adjusts the amplitude of voltage received from a DC voltage source 182". An error means 170" includes a differential amplifier 184" which subtractively combines the analog sensed and selected temperature signals to produce an analog error signal. A proportioning solenoid control means 172" includes an adding means 196 for adding the selected temperature signal and the error signal to produce an analog control signal. A differential amplifier 198 subtractively combines the control signal and the selected temperature signal to maintain the increase or decrease to the selected temperature signal mandated by the error signal. In operation, the selected temperature signal at first is the actuating signal. If the mixed fluid temperature does not match the selected temperature, an error signal is produced by the differential amplifier 184". The adding means 196 adds the error and selected temperature signals. In this manner, the actuating signal becomes the selected temperature signal adjusted by the error signal. This changes the position of the proportioning valve bringing the error signal toward zero. The differential amplifier 198 maintains the error offset as the error signal approaches zero. Whenever the error signal is nonzero, the control signal is changed accordingly. That is, when the sensed temperature varies from the selected temperature, the error differential amplifier produces an error signal. The error signal increases or decreases the control signal causing a corresponding change in the proportioning valve. The error signal approaches zero, the differential amplifier 198 maintains the level of the control signal. In this manner, the mixed fluid temperature control means D controls the proportioning valve such that the sensed and selected temperatures are maintained in coincidence.

The invention has been described with reference to the preferred and alternate embodiments. Obviously, modifications and alterations will occur to others upon reading and understanding the preceding detailed description of the preferred embodiment. It is intended that the invention include all such alterations and modifications which come within the scope of the appended claims or the equivalents thereof.

Having thus described preferred and alternate embodiments of the invention, the invention is now claimed to be:

1. A fluid mixing apparatus for mixing a cooler fluid flow with a warmer fluid flow to produce a mixed fluid flow having a selectable intermediate temperature, the mixing apparatus comprising:

means defining a cooler fluid inlet which is adapted to be connected with a source of the cooler fluid under pressure to receive the cooler fluid flow therefrom;

a first regulating assembly operatively connected with the cooler fluid inlet means for regulating the pressure of the cooler fluid;

means for defining a warmer fluid inlet which is adapted to be connected with a source of the warmer fluid under pressure to receive the warmer fluid flow therefrom;

a second regulating assembly operatively connected with the warmer fluid inlet means for regulating the pressure of the warmer fluid;

means for defining at least one mixed fluid outlet for discharging the mixed fluid flow, the mixed fluid flow developing a back pressure adjacent the mixed fluid outlet means;

a fluid pressure proportioning valve member movably disposed between the mixed fluid outlet means and the first and second regulating assemblies for selectively proportioning the back pressure between the first and second regulating assemblies, such that the fluid pressure proportioning valve member causes the first and second regulating assemblies to control the relative flow rates of the cooler and warmer fluid flows; and, mixed fluid temperature control means for controlling a median position of the fluid pressure proportioning valve member and for causing the fluid pressure proportioning valve member to dither about the median position such that the mixed fluid substantially maintains a selected intermediate temperature.

2. The mixing apparatus as set forth in claim 1 wherein the first and second regulating assemblies include:

a valve seat disposed between the inlet means and the proportioning means; and a pressure sensing means disposed between the valve seat and the proportioning means; and a movable valving member disposed adjacent the valve seat for defining a flow path with an adjustable cross section therebetween, the movable valving member being disposed between the inlet means and means defining a pilot reservoir, means defining a pilot supply aperture in fluid connection between the inlet means and the pilot reservoir means, means defining a pilot outlet aperture which is larger in cross section than the pilot supply aperture for selectively releasing fluid from the pilot reservoir means and a pilot valve for controlling fluid flow through the pilot outlet aperture means, the pilot valve being operatively connected with the pressure sensing means to vary the fluid flow through the pilot outlet aperture means in response to variations in the sensed pressure.

3. A fluid mixing apparatus for mixing a cooler fluid flow with a warmer fluid flow to produce a mixed fluid flow having a selectable intermediate temperature, the mixing apparatus comprising:

means defining a cooler fluid inlet which is adapted to be connected with a source of the cooler fluid under pressure to receive the cooler fluid flow therefrom;

a first regulating assembly operatively connected with the cooler fluid inlet means for regulating the pressure of the cooler fluid;

means for defining a warmer fluid inlet which is adapted to be connected with a source of the warmer fluid under pressure to receive the warmer fluid flow therefrom;

a second regulating assembly operatively connected with the warmer fluid inlet means for regulating the pressure of the warmer fluid;

means for defining at least one mixed fluid outlet for discharging the mixed fluid flow, the mixed fluid flow developing a back pressure adjacent the mixed fluid outlet means;

a fluid pressure proportioning valve member disposed between the mixed fluid outlet means and the first and second regulating assemblies for selectively proportioning the back pressure between the first and second regulating assemblies, such that the fluid pressure proportioning valve member causes the first and second regulating assemblies to control the relative flow rates of the cooler and warmer fluid flows;

a solenoid coil and armature for controlling movement of the fluid pressure proportioning valve member;

temperature sensing means for sensing mixed fluid temperature and producing a sensed temperature single indicative of the sensed temperature, the temperature sensing means being disposed adjacent mixed fluid flow outlet means to sense the temperature of the mixed fluid flow;

temperature selection means for producing a selected temperature signal indicative of the selected temperature;

an error means for determining an error between the actual and sensed temperatures, the error means being operatively connected with the temperature sensing and selection means; and a proportioning control means for producing a unipolar pulse train for controlling the fluid pressure proportioning valve member in accordance with the error between the sensed and selected signals, the proportioning control means being operatively connected with the solenoid coil and the error means.

4. The mixing apparatus as set forth in claim 3 wherein the proportioning control means controls at least one of a width and an amplitude of each pulse in the pulse train.

5. A fluid mixing apparatus for mixing a cooler fluid flow with a warmer fluid flow to produce a mixed fluid flow having a selectable intermediate temperature, the mixing apparatus comprising:

means defining a cooler fluid inlet which is adapted to be connected with a source of the cooler fluid under pressure to receive the cooler fluid flow therefrom;

a first regulating assembly operatively connected with the cooler fluid inlet means for regulating the pressure of the cooler fluid;

means for defining a warmer fluid inlet which is adapted to be connected with a source of the warmer fluid under pressure to receive the warmer fluid flow therefrom;

a second regulating assembly operatively connected with the warmer fluid inlet means for regulating the pressure of the warmer fluid;

means for defining at least one mixed fluid outlet for discharging the mixed fluid flow, the mixed fluid flow developing a back pressure adjacent the mixed fluid outlet means;

fluid pressure proportioning valve means disposed between the mixed fluid outlet means and the first and second regulating assemblies for selectively proportioning the back pressure between the first and second regulating assemblies such that the fluid pressure proportioning means causes the first and second regulating assemblies to control the relative flow rates of the cooler and warmer fluid flows, the fluid pressure proportioning means including:

a first proportioning valve seat in fluid communication with the first regulating assembly, a second proportioning valve seat in fluid communication with the second regulating assembly, a proportioning valve member disposed for movement relative to the first and second proportioning valve seats, and a proportioning valve coil for controlling the relative movement of the proportioning valve member; and, mixed fluid temperature control means for controlling the fluid pressure proportioning means, the mixed fluid temperature control means including:

temperature sensing means for sensing mixed fluid temperature and producing a sensed temperature signal indicative of the sensed temperature, the temperature sensing means being disposed adjacent mixed fluid flow outlet means to sense the temperature of the mixed fluid flow, temperature selection means for producing a selected temperature signal indicative of the selected temperature, an error means for determining an error between the actual and sensed temperatures, the error means being operatively connected with the temperature sensing and selection means, a proportioning control means for producing a control signal for controlling the pressure proportioning means in accordance with the error between the sensed and selected signals, the control signal having a variable DC component and an AC component, the DC component controlling a median position of the proportioning valve member and the AC component controlling dithering of the proportioning valve member.

6. A fluid mixing apparatus for mixing a first fluid flow with a second fluid flow to produce a mixed fluid flow, the mixing apparatus comprising:

means for supplying a first fluid through a first port at a first pressure;

means for supplying a second fluid through a second port at a second pressure;

a proportioning valve member movably disposed between the first and second ports;

a proportioning valve controller for controlling movement of the proportioning valve member relative to the first and second ports, the proportioning valve controller (a) controlling a median position of the proportioning valve member and (b) causing the proportioning valve member to dither about the median position; and, a control means for causing the proportioning valve controller to adjust the proportioning valve member median position to adjust the proportion of the first and second fluids.

7. The mixing apparatus as set forth in claim 6 wherein the first fluid supplying means includes:

means defining a first fluid inlet which is adapted to be connected with a source of the first fluid under pressure to receive the first fluid therefrom;

a first regulating assembly operatively connected with the first fluid inlet means for regulating the pressure of the first fluid.

8. The mixing apparatus as set forth in claim 7 wherein the second fluid supplying means includes:

means for defining a second fluid inlet which is adapted to be connected with a source of the second fluid under pressure to receive the second fluid therefrom;

a second regulating assembly operatively connected with the second fluid inlet means for regulating the pressure of the second fluid.

9. The mixing apparatus as set forth in claim 8 wherein each of the first and second regulating assemblies includes:

a pressure sensing means for sensing pressure adjacent the fluid pressure proportioning means and an adjustable valving means for selectively varying the cross section of a flow path disposed between the inlet means and the proportioning means, the adjustable valving means being operatively connected with the pressure sensing means such that the flow path cross section is variable to the sensed pressure generally constant.

10. The mixing apparatus as set forth in claim 9 further including a damping chamber disposed between the pressure sensing means of the first and second regulating assemblies, the damping chamber limiting the speed at which the pressure sensing means respond to changes in pressure, whereby the damping chamber inhibits sudden pressure changes from throwing the first and second regulating assemblies into oscillating or rapidly changing modes.

11. The mixing apparatus as set forth in claim 9 wherein said pressure sensing means includes a displaceable structure which is physically displaced in response to changes in sensed pressure.

12. The mixing apparatus as set forth in claim 11 wherein the adjustable valving means includes a stationary valve seat and a movable valving member which is movable relative to the valve seat to adjust the cross section of the flow path therebetween, the movable valving member being operatively connected with the displaceable structure for movement generally in response to movement thereof.

13. The mixing apparatus as set forth in claim 12 further a valve member biasing means operatively connected with the movable valving member.

14. The mixing apparatus as set forth in claim 12 wherein the movable valving member includes a valving diaphragm having a first face disposed adjacent the inlet and a second face disposed adjacent means for defining a pilot reservoir, the valving diaphragm having at least one aperture therethrough for permitting fluid communication between the inlet means and the pilot reservoir means.

15. The mixing apparatus as set forth in claim 14 further including a pilot valve for selectively opening and closing a pilot outlet aperture from the pilot reservoir means, the pilot valve being operatively connected with said pressure sensing means such that the pilot valve means increases the opening of the pilot outlet aperture in response to a drop in the sensed pressure.

16. The mixing apparatus as set forth in claim 15 further including a spring operatively connected with the movable valving member and the pilot valve which tends to bias the pilot valve means to its open position and tends to bias the movable valving member toward the valve seat.

17. The mixing apparatus as set forth in claim 8 further including:

means for defining at least one mixed fluid outlet for discharging the mixed fluid flow, the mixed fluid flow developing a back pressure adjacent the mixed fluid outlet means.

18. The mixing apparatus as set forth in claim 17 further including mixed fluid flow rate adjusting means for selectively adjusting the back pressure, whereby the mixed fluid flow rate is selectively varied.

19. The mixing apparatus as set forth in claim 18 wherein the mixed fluid flow rate adjusting means includes means for defining a first mixed fluid outlet and a second mixed fluid outlet, the first and second mixed fluid outlet means having segments with different cross section flow paths therein such that each mixed fluid outlet means develops a different back pressure, and flow rate control valve means for selectively connecting the first and second ports with the first and second mixed fluid outlet means.

* * * * *